(12) United States Patent
Lee et al.

(10) Patent No.: US 7,068,738 B2
(45) Date of Patent: Jun. 27, 2006

(54) FQPSK-B VITERBI RECEIVER

(75) Inventors: Dennis K. Lee, Alhambra, CA (US); Marvin K. Simon, La Canada, CA (US); Tsun-Yee Yan, Northridge, CA (US)

(73) Assignee: California Institute of Technology, Pasadena, CA (US)

( * ) Notice: Subject to any disclaimer, the term of this patent is extended or adjusted under 35 U.S.C. 154(b) by 777 days.

(21) Appl. No.: 10/051,617

(22) Filed: Jan. 16, 2002

(65) Prior Publication Data
US 2002/0172300 A1 Nov. 21, 2002

Related U.S. Application Data

(60) Provisional application No. 60/262,019, filed on Jan. 16, 2001.

(51) Int. Cl.
*H03D 3/22* (2006.01)
(52) U.S. Cl. ...................... 375/329; 375/341
(58) Field of Classification Search .............. 375/329, 375/341
See application file for complete search history.

(56) References Cited

U.S. PATENT DOCUMENTS 6,757,334 B1 *  6/2004  Feher ................... 375/259

OTHER PUBLICATIONS

Yanpeng Guo; Feher, K., "Power and spectrally efficient SFH-FQPSK for PCS applications", IEEE Transactions on Vehicular Technology, vol. 43, Issue 3, Part 1-2, Aug. 1994 pp.: 795-800.*

* cited by examiner

*Primary Examiner*—Kevin Burd
*Assistant Examiner*—Juan Alberto Torres
(74) *Attorney, Agent, or Firm*—Fish & Richardson P.C.

(57) ABSTRACT

An FQPSK-B receiver uses a simplified trellis system which uses combinations of FQPSK-B waveforms to correlate against an input signal. This enables reduction of the number of correlators that are used and the number of comparisons that are made by the correlators.

20 Claims, 5 Drawing Sheets

US 7,068,738 B2

FQPSK-B VITERBI RECEIVER

CROSS-RELATED APPLICATION

The present application claims priority from provisional application No. 60/262,019, filed Jan. 16, 2001.

STATEMENT AS TO FEDERALLY-SPONSORED RESEARCH

The invention described herein was made in the performance of work under a NASA 7-1407 contract, and is subject to the provisions of Public Law 96-517 (U.S.C. 202) in which the contractor has elected to retain title.

The present application describes a special kind of Feher's Quaternary phase shift keying (FQPSK) Viterbi receiver.

BACKGROUND

Feher's Patent QPSK ("FQPSK") is a spectrally efficient form of offset QPSK modulation which uses pulse shaping in order to reduce spectral sidelobes, and cross-correlation between its in-phase ("I") and quadrature phase ("Q") baseband signals, in order to maintain a nearly constant signal envelope. These characteristics of FQPSK may make this format desirable for communication [s] in nonlinear, bandwidth-constrained channels.

A special form of FQPSK described in U.S. Pat. Nos. 4,567,602 and 5,491,457, is known as FQPSK-B. This is a baseband filtered version of FQPSK which is more spectrally efficient than unfiltered FQPSK and thus is useful in limited bandwidth channels. However, the bandwidth limiting of FQPSK-B comes at the expense of bit error rate degradation caused by the introduction of intersymbol interference due to the baseband filtering. For example, a traditional receiver for FQPSK-B may have a bit error rate of 1.4 dB at $10^{-3}$.

FQPSK-B signals may be demodulated using symbol-by-symbol detection. This kind of demodulator may be formed of a detection filter along with a sample and hold circuit.

While this forms a simple circuit, the demodulating circuit does not take sufficient advantage of the "memory" that is inherent in FQPSK-B signals. Because of this memory between signals, Viterbi demodulation may be optimum for this type of modulation. Viterbi modulation may provide better bit error rate performance.

A trellis-coded interpretation of FQPSK is known. The FQPSK signal is generated by transmitting one of 16 different shaped waveforms. The basic waveform shapes are shown in Figure 1. Eight unique waveforms are shown in FIG. 1. Eight other shapes, which are the negatives of those waveforms, are also used. These waveshapes characterize the 16 state trellis that represent the optimum Viterbi receiver for FQPSK (or FQPSK-B). A full-blown system of this type, while feasible, may be too complex for a commercial implementation.

A full-blown system of this type, however, may be too complex for a real implementation.

SUMMARY

The present application teaches a special Viterbi receiver that has reduced complexity but still has bit error rate advantages over a symbol-by-symbol detection type receiver. According to an embodiment, he waveforms forming the FQPSK-B signals are grouped in a special way to create a simpler trellis, i.e., one with fewer states. This receiver will still provide significant gain over conventional FQPSK-B receivers, while reducing the complexity that would otherwise be inherent in an optimum FQPSK-B Viterbi receiver.

BRIEF DESCRIPTION OF THE DRAWINGS

These and other aspects will now be described in detail with reference to the accompanying drawings, wherein.

DETAILED DESCRIPTION

The present invention defines a reduced complexity alternative system. This system may form a simplified FQPSK-B Viterbi receiver with a reduced number of correlators. For example, the receiver may have a factor of 4 fewer correlators in the receiver, and a factor of 8 fewer trellis branch computations.

In an embodiment, the 16 possible FQPSK-B waveforms are divided into 4 groups. Each group may include signals, for example, which have some similar characteristic. A FQPSK signal is received. This signal is correlated against the average of the waveforms in each group. The signals are appropriately grouped, as described herein, in a way that reduces the FQPSK trellis from a 16 state trellis with 4 transitions per state into two independent two-state trellises with only two transitions per state. Due to the similarity between the PQPSK-B waveforms, this reduced-complexity receiver only has a small $E_b/N_0$ penalty as compared with a full-blown Viterbi receiver. However, it offers significant performance gains as compared to the conventional FQPSK-B receiver. Special characteristics of this receiver are hence described.

A traditional commercial FQPSK-B receiver includes a sample and hold receiver that carries out symbol-by-symbol detection. The received signal is downconverted to baseband. The baseband signal is then filtered using a detection filter. The output of the detection filter is sampled, and a decision on the transmitted signal is made.

Figure 2:
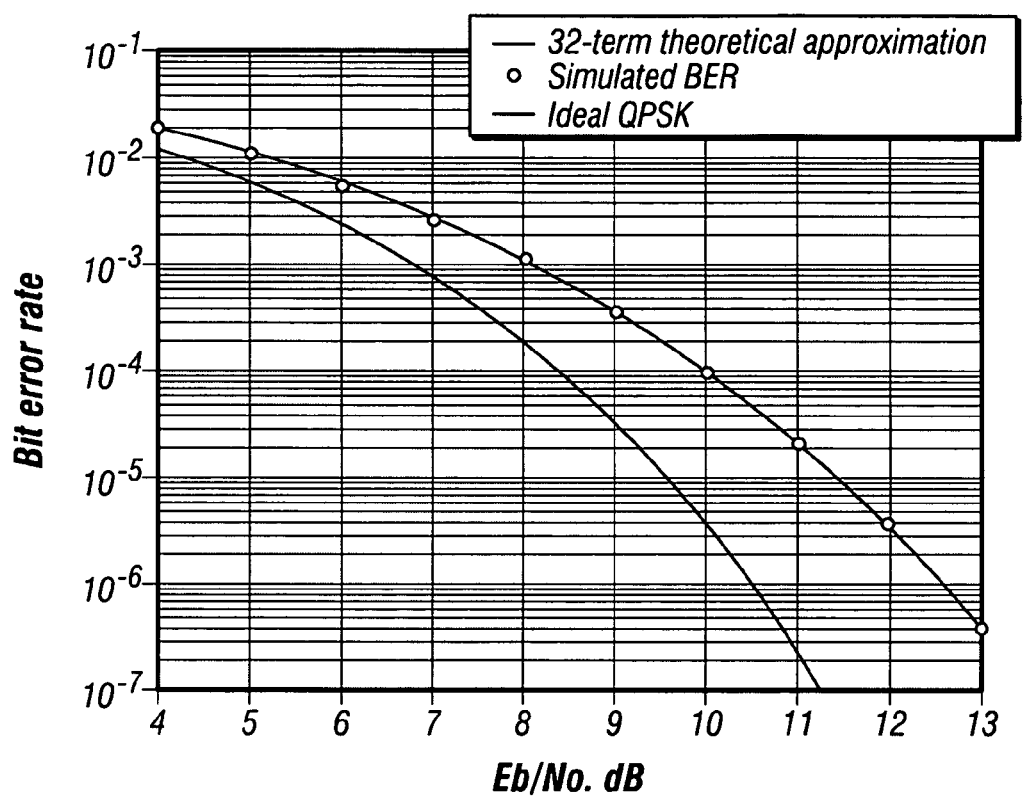
FIG. 2 shows a graph with a comparison of bit error rates for different FQPSK receivers.

Intersymbol interference introduced by the input filter will increase the bit error probability of this receiver. FIG. 2 shows a comparison between the 32 term theoretical approximation of bit error probability, and the computer simulated results. This is further compared with the bit error probability of ideal QPSK in the figure.

Figure 3:
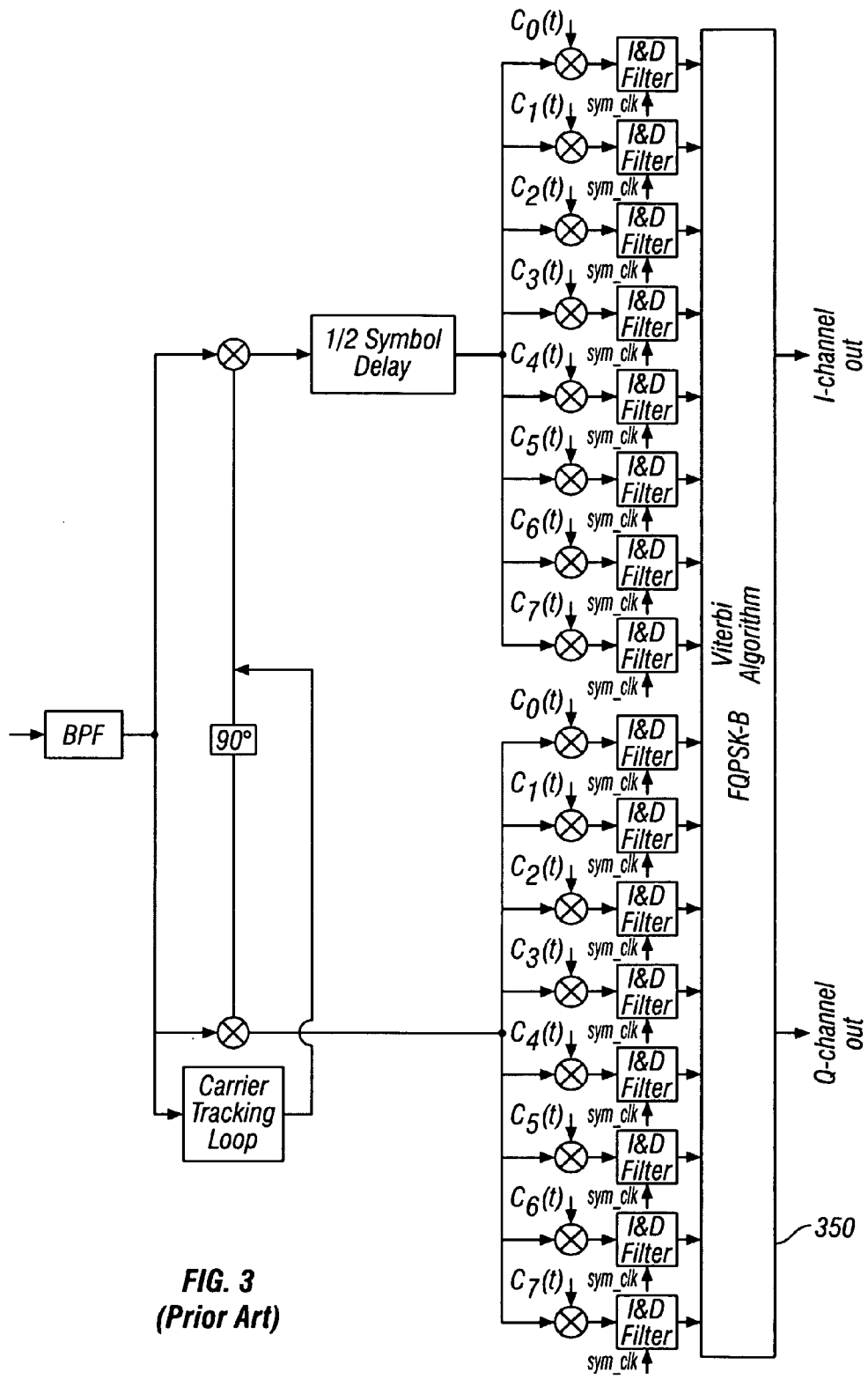
FIG. 3 shows a block diagram of a conventional Viterbi receiver.

A traditional FQPSK-B Viterbi receiver is shown in FIG. 3. This receiver may correlate the baseband received signal with the 16 FQPSK waveforms, and uses a Viterbi. Algorithm (VA) to perform trellis decoding. The Viterbi algorithm search along the transitions between states of the FQPSK trellis to find the path with the largest accumulated branch metric. The 16 Viterbi algorithm branch metrics $Z_j$ are defined as follows:

$$Z_j = R_j - \frac{E_j}{2} \quad j = 0, \ldots, 15 \quad (1)$$

where $R_j$ is the correlation of the received signal and the jth waveforms, $E_j$ is the energy in the jth waveform. The correlation values $R_8$ through $R_{15}$ are obtained by taking the negatives of $R_0$ through $R_7$ respectively. For example, $R_0 = -R_8$. A total of 16 correlators are needed, with 8 correlators being needed for the in phase signals and 8 correlators being needed for the quadrature phase signals. The "Viterbi algorithm" block 350 may carry out the subtraction of $E_j/2$ from the value $R_j$.

Figure 1:
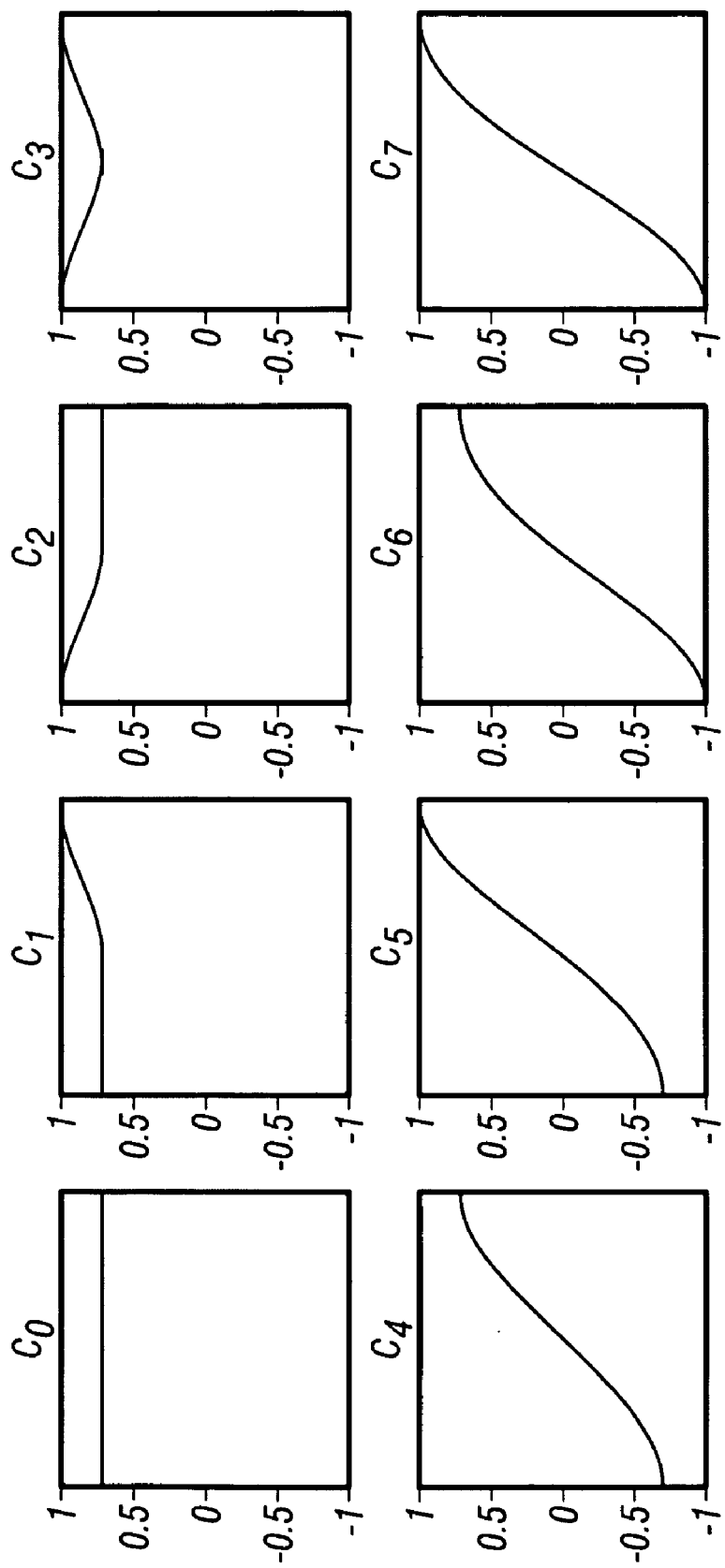
FIG. 1 shows waveforms for a conventional FQPSK system.
Figure 4:
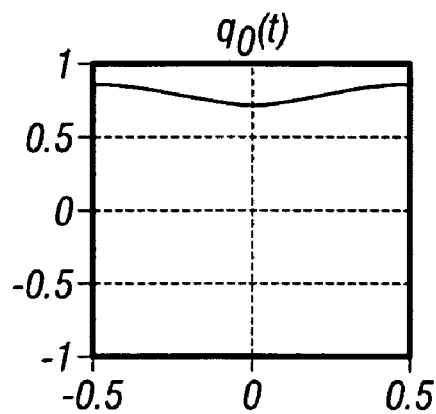
FIG. 4 shows a set of averaged waveforms for the Viterbi receiver.
Figure 4:
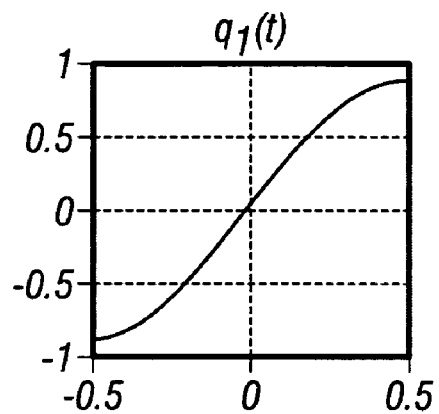
Figure 4:
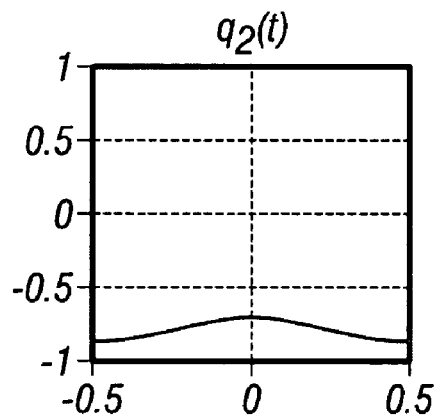
Figure 4:
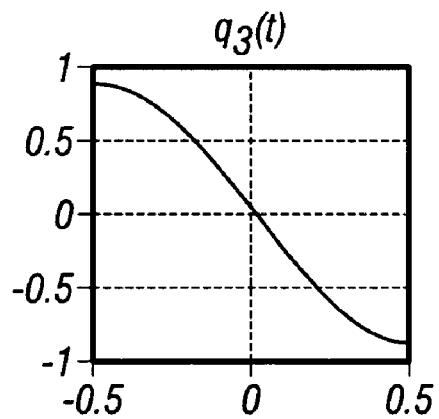

A simplified FQPSK-B Viterbi receiver is described with reference to FIGS. 4 and 5. In this embodiment, sets of waveforms are grouped together in order to create a reduced trellis. In the embodiment, the waveforms $C_0$, $C_1$, $C_2$ and $C_3$, as represented by the top row in FIG. 1, are grouped into a first group. As can be seen by investigating these waveforms, each of the waveforms have "similar" properties. A second group is formed of the second row in FIG. 1, including the waveforms $C_4$, $C_5$, $C_6$, and $C_7$. For example, $C_0$–$C_3$ each represent waveforms which have small or no deviation from a constant. Similarly $C_4$–$C_7$ represent waveforms which have small or no deviation from a sinusoid. That is, the waveforms within each group are spectrally similar, so that the combination (average) of these waveforms may also be spectrally similar to each of the waveforms being averaged. The third group of waveforms is formed of $C_8$–$C_{11}$, and a fourth group of waveforms is formed from $C_{12}$–$C_{15}$. This grouping enables the trellis-coded structure to be divided into two independent, in-phase and quadrature, two-state trellises.

Figure 5:
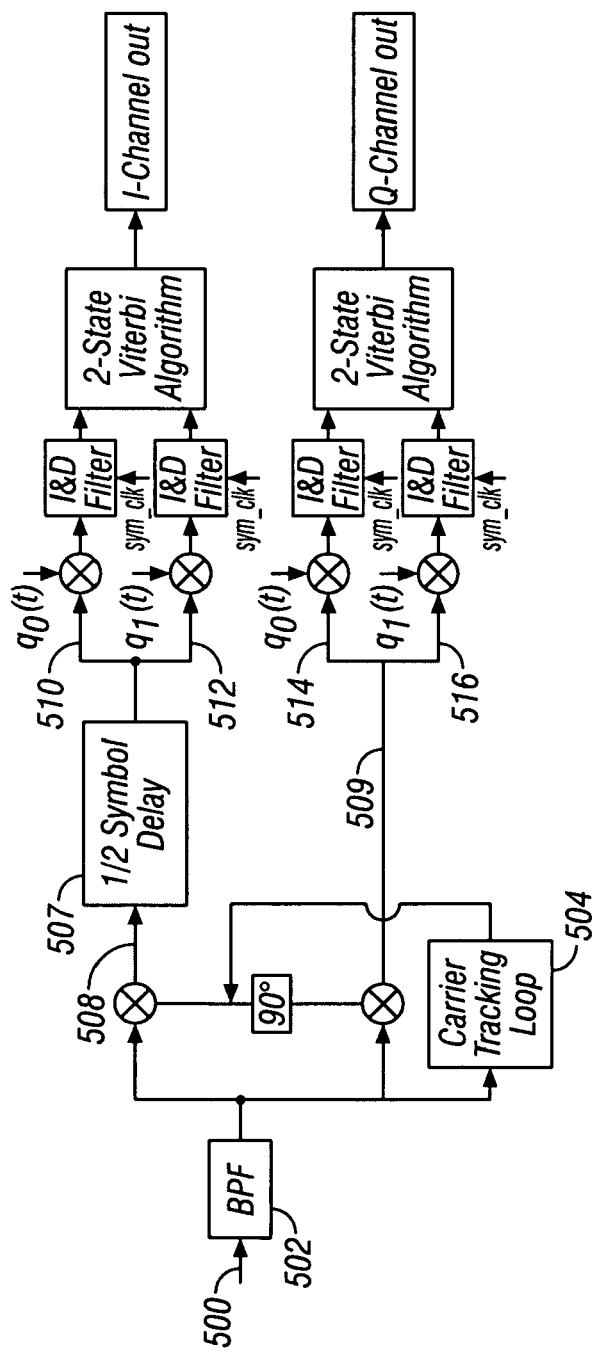
FIG. 5 shows a block diagram an embodiment of a simplified FQPSK-B receiver.

FIG. 5 shows a block diagram of the modified receiver. The received signal 500 is filtered by 502 and demodulated by demodulator 504. The demodulated signals include an in-phase signal 508 and quadrature signal 509. The in-phase signal 508 is delayed by a half symbol by delay element 507. The demodulated signal is correlated against the average of the waveforms in each group. Four correlators 510, 512, 514, 516 are used for this correlation. The average values are shown in FIG. 4, and obtained as:

Equations

Since q2 and q3 are respectively the negatives of $q_0$ and $q_1$. Only two $q_2$, $q_3$, $q_0$, $q_1$, correlators are needed for each of the I and Q channels. The same Viterbi algorithm metric is used in equation 1, except that $E_j$ now represents the energy of the group average waveform $q_j(t)$.

Figure 6:
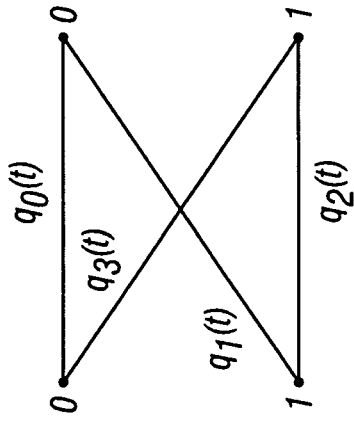
FIG. 6 shows a trellis diagram for the simplified FQPSK-B receiver.

FIG. 6 shows a trellis including group signals with two states and two transitions in each state. The dual Viterbi techniques for the I and Q channels can hence be combined into a single 4 state VA. Compared with the full Viterbi receiver, this simplified receiver may have 12 fewer correlators, and an eight fold reduction in the number of Viterbi algorithm computations per decoded bit.

Although only a few embodiments have been disclosed in detail above, other modifications are possible. All such modifications are intended to be encompassed within the following claims.

What is claimed is:

1. A receiver, comprising:
    a plurality of averaged waveforms, each said averaged waveform comprising an average of a plurality of FQPSK waveforms;
    a plurality of correlators, to correlate an input signal with each of said averaged waveforms of said plurality to form correlations; and
    a trellis decoder using said correlations to make decisions on the transmitted signals.

2. A receiver as in claim 1, wherein said plurality of averaged waveforms each represent four FQPSK waveforms.

3. A receiver as in claim 1, further comprising an input filter which filters an input signal.

4. A receiver as in claim 1, further comprising a demodulator, receiving an input signal, and producing demodulated complex signals.

5. A receiver as in claim 4, wherein said demodulated complex signals include an in-phase signal and a quadrature signal component.

6. A receiver as in claim 2, wherein there are four of said correlators to correlate said FQPSK waveforms.

7. A receiver as in claim 1, wherein each of said plurality of averaged waveforms include a plurality of basic FQPSK waveforms which have similar characteristics.

8. A receiver as in claim 7, wherein each averaged waveform comprised a combination average of four FQPSK waveforms.

9. A receiver as in claim 1, wherein said FQPSK waveform are FQPSK or FQPSK-B, waveforms.

10. A method, comprising:
    obtaining a plurality of basic waveforms which represent trellis waveforms for FQPSK or FQPSK-B;
    averaging groups of said plurality of waveforms to form averaged waveforms, wherein a number of said averaged waveforms is less than a number of said plurality of waveforms; and
    correlating an FQPSK-B input signal against said averaged waveforms to form a group of signals to be processed by a trellis decoder.

11. A method as in claim 10, wherein said averaging groups comprises averaging tour of said PQPSK-B waveforms to form each averaged waveforms.

12. A method as in claim 10, further comprising filtering an input signal, and wherein said correlating comprises correlating against a filtered input signal.

13. A method as in claim 10, further comprising producing demodulated signals form input signals and a set of correlation from said demodulated signals.

14. A method as in claim 13, wherein said demodulated signals include an in-phase signal and a quadrature signal.

15. A method as in claim 10, wherein said correlating comprises using four of said correlators to correlated the demodulated inphase and quadrature input signal with said FQPSK-B waveforms.

16. A method as in claim 10, wherein said plurality of averaged waveforms include a plurality of waveforms which have similar characteristics.

17. A method as in claim 10, wherein each averaged waveforms comprise a combination of four FQPSK waveforms.

18. A receiver, comprising:
    a filter element, receiving an input PQPSK-B signal and producing a filtered FQPSK-B signal; and
    a Viterbi Algorithm receiver, producing demodulated signals based on said FQPSK-B input signals, wherein said Viterbi Algorithm receiver compares said filtered FQPSK-B signal with a plurality of averaged signals.

19. A method of receiving an FQPSK-B signal, comprising:

obtaining a plurality of basic FPQSK-B signals associated with modulation of an FQPSK-B signal;

averaging said plurality of basic FQPSK-B signals to form a plurality of averaged signals; and comparing an input coded FQPSK-B signal with said plurality of averaged signals to carry out the modulation.

20. A method as in claim 19, wherein there are 16 of said basic FQPSK-B signals, and wherein there are four of said averaged signals.

* * * * *